(No Model.) 3 Sheets—Sheet 1.

F. H. RICHARDS.
MECHANICAL MOVEMENT.

No. 340,248. Patented Apr. 20, 1886.

Witnesses:
Frank H. Pierpont
Wilbur M. Stone.

Inventor:
Francis H. Richards.

(No Model.) 3 Sheets—Sheet 2.
F. H. RICHARDS.
MECHANICAL MOVEMENT.
No. 340,248. Patented Apr. 20, 1886.
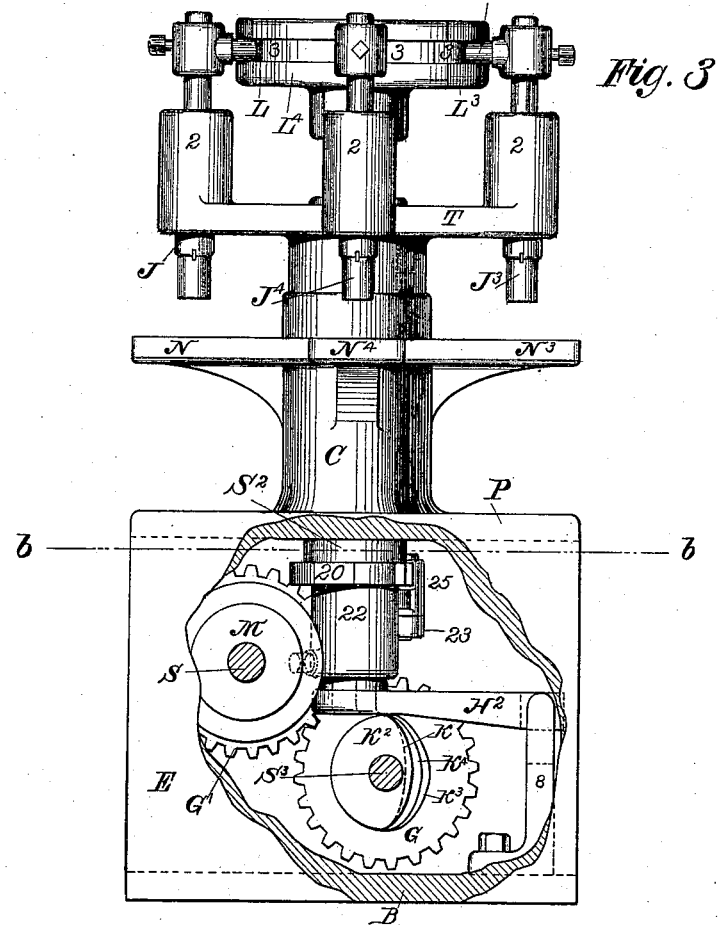
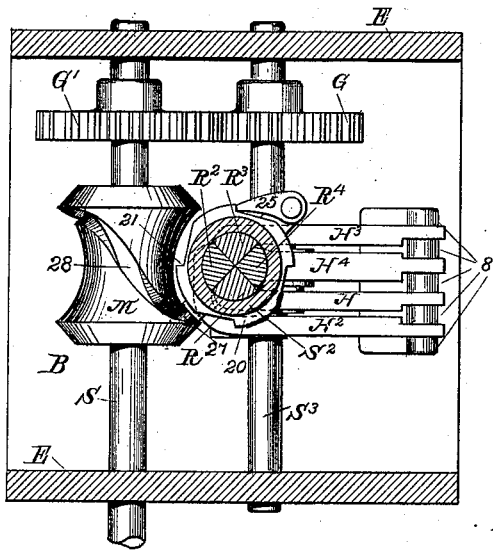
Witnesses:
Frank H. Pierpont
Wilbur M. Stone
Inventor:
Francis H. Richards.

(No Model.)  3 Sheets—Sheet 3.
F. H. RICHARDS.
MECHANICAL MOVEMENT.
No. 340,248.  Patented Apr. 20, 1886.
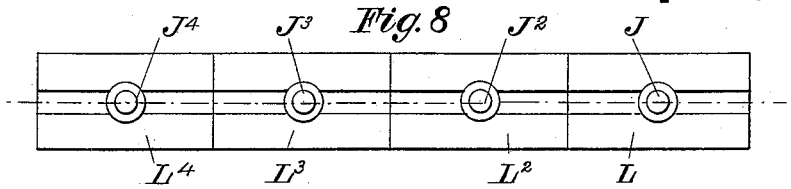
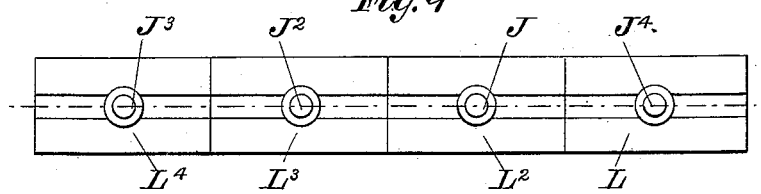
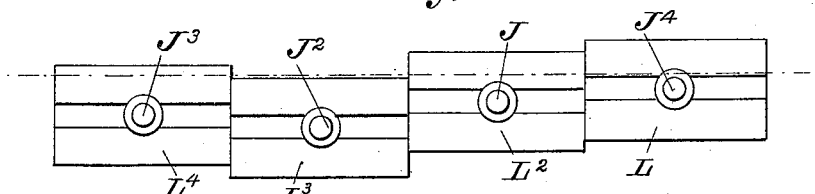
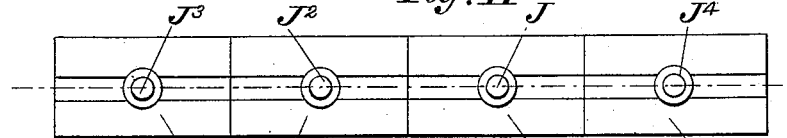
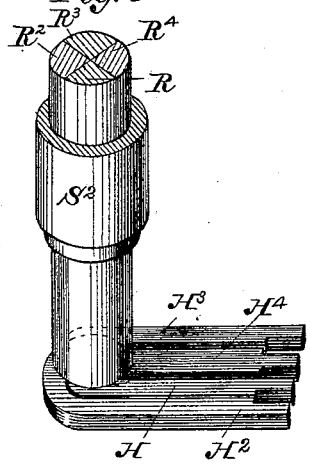
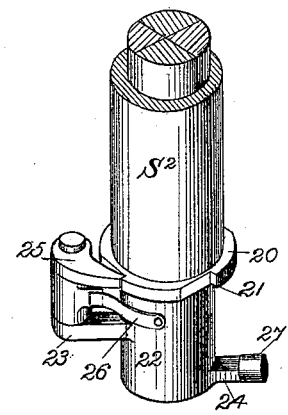
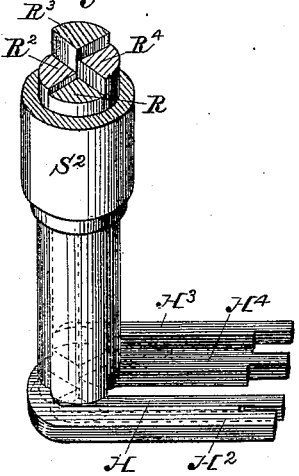
Witnesses:
Frank H. Pierpont
Wilbur M. Stone
Inventor:
Francis H. Richards

UNITED STATES PATENT OFFICE.

FRANCIS H. RICHARDS, OF SPRINGFIELD, MASS., ASSIGNOR OF ONE-HALF TO THE PRATT & WHITNEY COMPANY, OF HARTFORD, CONN.

MECHANICAL MOVEMENT.

SPECIFICATION forming part of Letters Patent No. 340,248, dated April 20, 1886.

Application filed October 19, 1885. Serial No. 180,365. (No model.)

*To all whom it may concern:*

Be it known that I, FRANCIS H. RICHARDS, a citizen of the United States, residing at Springfield, in the county of Hampden, State of Massachusetts, have invented certain new and useful Improvements in Mechanical Movements, of which the following is a specification.

This invention relates to mechanical movements for actuating slides, the object being to provide such an apparatus adapted to carry one or more slides successively to each of a series of stations, and there impart to said slides a reciprocating motion.

To this end the invention consists in the combinations hereinafter set forth.

Figure 1:
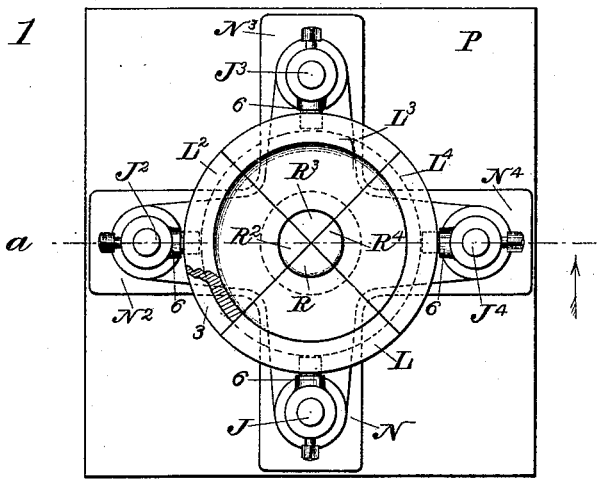
Figure 2:
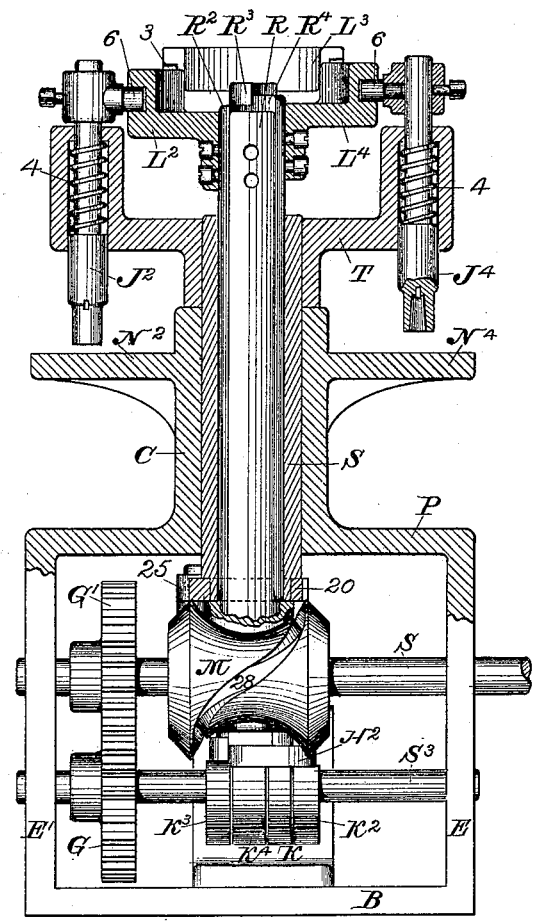

In the drawings accompanying and forming a part of this specification, Figure 1 is a top view of a mechanical movement embodying my invention. Fig. 2 is a vertical section in line $a\ a$, as seen from the front. Fig. 3 is an elevation of the end at the right hand in Figs. 1 and 2, a part of the frame being broken away to disclose the operative mechanism. Fig. 4 is a horizontal section in line $b\ b$, Fig. 3, showing what is below said line. Fig. 5 is a perspective view of the ratchet and pawl for feeding the turret. Fig. 6 is a similar view of the lifter-arms in one position. Fig. 7 is a view of the same in a different position. Figs. 8, 9, 10, and 11 are diagrams illustrating the operation of the mechanism.

Similar characters designate like parts in all the figures.

The several operative parts of my newly-invented mechanical movement are supported by a frame-work, which, as herein shown, is constructed as follows: B is a base-plate having ends E E' for supporting the top plate, P. Rising from said plate P there is a hollow column, C, which serves as a bearing for a tubular shaft, $S^2$, and which may have also projecting shelves or stations N, $N^2$, $N^3$, and $N^4$, (designated singly without choice or collectively as station or stations N,) whereon to place whatever things are to be acted on by means of the corresponding slides described below. A turret, T, is rigidly fixed to or formed on the upper end of shaft $S^2$, and has a series of bearings, 2, carrying the slides individually designated as J, $J^2$, $J^3$, and $J^4$, and singly, without choice or collectively, as slide or slides J. These slides, which usually do not turn in their bearings, are pushed down by springs 4, and are raised up by a series of lifters, L, $L^2$, $L^3$, and $L^4$, fixed on the upper end of lifter-rods R, $R^2$, $R^3$, and $R^4$. Said lifters together form a circle, as shown in Fig. 1, and all have the similar grooves, 3, in which run the pins 6, one of these being fixed on each slide.

An independent vertical movement is imparted to one or more (in this case all) of the lifters as follows: The lifters are respectively fixed on the top of lifter-rods R, $R^2$, $R^3$, and $R^4$, which extend down through shaft $S^2$, and are each respectively provided with a lifter-arm, H, $H^2$, $H^3$, and $H^4$. The outer ends of these arms extend between guides 8, which are provided for the purpose of preventing the rods R from turning out of proper position. Said rods are each lifted vertically by a series of cams, K, $K^2$, $K^3$, and $K^4$, which are fixed on shaft $S^3$, which is driven by gears G and G' from shaft S. These cams are to be constructed and operated to impart the required movements to the slides at the proper times.

Shaft $S^2$ and turret T, carried thereon, have an intermittent rotary movement imparted to them by means of some suitable mechanism, which I designate as the "rotating mechanism," and which, as I now prefer to construct it, consists of the following: At its lower end said shaft has affixed thereto a ratchet-wheel, 20, having a series of notches, 21, Fig. 4, equal in number to spindles J. Below this wheel a sleeve, 22, is fitted to turn freely on rods R or on an extension of shaft, $S^2$. Said sleeve has two arms, 23 and 24, the first of which carries a pawl, 25, for operating said wheel, (being kept against the wheel by spring 26,) while arm 24 carries a roll, (or pin,) 27, which works in groove 28 of the cam M. The nature of this groove will be readily understood by comparing the several figures of drawings, in which the cam is shown, it being proportioned so as to oscillate arm 24 through an arc of a little more than ninety degrees. The two sides of said cam being symmetrical, the pawl 25, and by it the ratchet-wheel, shaft, and turret, are moved forward in one half-revolution of shaft S, and the pawl is returned during the next half-revolution.

As an equivalent for the above-described rotating mechanism, I may use the "mechanism for converting motion" described and claimed in United States Patent No. 297,165, granted to me April 22, 1884, the application of which to my present purposes will be obvious.

I have herein shown and described the turret and lifting-cam as placed above their operating mechanisms. This arrangement is not essential to my invention, for by a suitable modification of the frame-work said mechanisms may obviously be placed uppermost.

In Figs. 8 to 11 I have shown the lifters L as if arranged in a straight line, and have supposed the slides J to be situated in a straight line alongside thereof; and as said slides have the same movements as their pins 6, I have, for the sake of simplicity, omitted in these figures the drawing of said slides, and have shown the pins designated by the characters belonging to said slides, thus making the pin a symbol of itself and its slide together.

The operation of my improved mechanical movement is as follows: On rotating shaft S, the rotating mechanism operates as above described to impart an intermittent forward movement to the turret, carrying each slide J successively to each station N. During this time the cams K hold the lifters in the same plane, so that the pins may pass from the groove of one lifter to that of the next, as shown in Fig. 8.

In Fig. 8 is shown the positions of slides J and of the several lifters relative to each other at the beginning of a forward movement, this being toward the left hand. In Fig. 9 said movement has been completed, the relations of the lifters being maintained. The slides are advanced one station. In Fig. 10 the slides remain at the same stations as in Fig. 9; but the lifters are shown at different heights. In Fig. 11 the lifters have completed their return movement and stand in line, as in Fig. 9. The several operations continuing, as described, each slide is brought successively to every station, and every slide successively to each station; but whichever slide may during one complete movement be at a given station its operation while there is always the same, and at each different station the slides may have a different vertical movement.

Having thus described my invention, I claim—

1. The combination, in a mechanical movement having stations arranged in a circuit, of one or more slides, mechanism, substantially as described, carrying said slide or slides to each of said stations successively, one or more lifters, substantially as described, operating said slides, and mechanism, substantially as described, imparting a reciprocating movement to the lifters at one or more of said stations, substantially as set forth.

2. The combination of a mechanical movement having stations arranged in a circuit, of an intermittently rotating turret having bearings corresponding to said stations, slides in said bearings, non rotating slide-lifters, substantially as described, corresponding to said stations, cams operating said lifters at said stations, and means, substantially as described, operating said turret and cams, substantially as set forth.

3. The combination, in a mechanical movement, of turret T, having bearings for slides, slides J, carried in said bearings, and having rolls or pins 6, lifters L, having grooves 3, rods R, and means, substantially as described, imparting an intermittent rotary movement to said turret and a vertically-reciprocating movement to said rods, substantially as set forth.

FRANCIS H. RICHARDS.

Witnesses:
FRANK H. PIERPONT,
WILBUR M. STONE.